(12) United States Patent
Rossi et al.

(10) Patent No.: US 7,288,895 B2
(45) Date of Patent: Oct. 30, 2007

(54) SYSTEM TO IMPROVE DISPLAY EFFICIENCY BASED ON RECYCLING LOCAL HEAT SOURCE

(75) Inventors: Thomas M. Rossi, Cupertino, CA (US); Himanshu Pokharna, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/715,977

(22) Filed: Nov. 17, 2003

(65) Prior Publication Data

US 2005/0104526 A1   May 19, 2005

(51) Int. Cl.
*H01J 7/24* (2006.01)
*H05K 7/20* (2006.01)

(52) U.S. Cl. ...................... 315/112; 361/704
(58) Field of Classification Search ............ 315/56, 315/63, 112; 361/679, 683, 704
See application file for complete search history.

(56) References Cited

U.S. PATENT DOCUMENTS

| | | | |
|---|---|---|---|
| 5,119,215 A | 6/1992 | Marks et al. | 349/161 |
| 5,146,354 A | 9/1992 | Plesinger | 349/59 |
| 5,247,374 A | 9/1993 | Terada | 349/161 |
| 5,255,109 A | 10/1993 | Klein | 349/84 |
| 5,255,351 A | 10/1993 | Takanashi et al. | 358/1.9 |
| 5,285,351 A | 2/1994 | Ikeda | 361/699 |
| 5,383,340 A | 1/1995 | Larson et al. | 62/259.2 |
| 5,394,936 A | 3/1995 | Budelman | 348/373 |
| 5,502,582 A | 3/1996 | Larson et al. | 349/62 |
| 5,606,341 A | 2/1997 | Aguilera | 345/87 |
| 5,621,613 A * | 4/1997 | Haley et al. | 361/687 |
| 5,646,822 A * | 7/1997 | Bhatia et al. | 361/687 |
| 5,718,282 A * | 2/1998 | Bhatia et al. | 165/86 |
| 5,742,341 A | 4/1998 | Imoto | 348/373 |
| 5,781,409 A * | 7/1998 | Mecredy, III | 361/687 |
| 5,796,581 A * | 8/1998 | Mok | 361/687 |
| 5,822,187 A * | 10/1998 | Garner et al. | 361/687 |
| 5,832,987 A * | 11/1998 | Lowry et al. | 165/86 |
| 5,910,883 A * | 6/1999 | Cipolla et al. | 361/687 |
| 6,252,355 B1 * | 6/2001 | Meldrum et al. | 315/150 |
| 6,288,896 B1 * | 9/2001 | Hsu | 361/687 |
| 6,310,436 B1 | 10/2001 | Ge et al. | 313/493 |
| 6,316,872 B1 | 11/2001 | Ge et al. | 313/493 |
| 6,330,154 B1 * | 12/2001 | Fryers et al. | 361/695 |
| 6,441,874 B1 | 8/2002 | Saito et al. | 349/70 |
| 6,493,440 B2 | 12/2002 | Gromatzky et al. | 379/161 |
| 6,535,266 B1 | 3/2003 | Nemeth et al. | 349/161 |
| 7,042,436 B2 | 5/2006 | Rossi | 345/102 |
| 2003/0132929 A1* | 7/2003 | Woo | 345/211 |
| 2004/0246247 A1 | 12/2004 | Rossi | |

* cited by examiner

*Primary Examiner*—Thuy Vinh Tran
(74) *Attorney, Agent, or Firm*—Blakely, Sokoloff, Taylor & Zafman LLP

(57) ABSTRACT

A system to improve display efficiency based on recycling a local heat source. In one embodiment, the system includes a display and a lamp to illuminate the display. Heat from a heat generating component within the system in transferred to the lamp. In one embodiment, the lamp is a cold cathode fluorescent lamp (CCFL). The heat can be transferred to the lamp via conduction or convection.

24 Claims, 4 Drawing Sheets

SYSTEM TO IMPROVE DISPLAY EFFICIENCY BASED ON RECYCLING LOCAL HEAT SOURCE

FIELD OF INVENTION

The field of invention relates generally to display back lighting systems; and, more specifically, to an improved display efficiency based on recycling local heat source.

BACKGROUND

Current digital displays employ an optically transmissive surface with a backlight that passes white light through a series of electronically controlled red, green, blue (RGB) optical filters. Image brightness is controlled by the backlight brightness setting and the RGB filter settings. Backlight brightness in turn is controlled by the electrical power applied by the associated backlight power module, as well as by the transmission efficiency of the actual backlight device.

Portable applications such as notebook computers often prefer to minimize the power drain from their local battery source. Digital displays often consume 25-50% of the total average system application power consumption, with the backlight representing a major percentage of the total display power.

Common digital displays often employ a cold-cathode fluorescent lamp (CCFL) as the primary backlight source. CCFL light output is a function of the input power applied to it, as well as the lamp operating temperature. Higher light output levels often result in a form of self-heating that helps reduce the amount of electrical power necessary per unit of luminance. Conversely, applications which run at the lower range of available lamp luminance may require a larger amount of electrical input power to achieve a given level of luminance.

FIGURES

One or more embodiments are illustrated by way of example, and not limitation, in the Figures of the accompanying drawings, in which FIG. 1 illustrates a system to transfer and apply heat from a heat generating component within the system to a lamp of a display, according to one embodiment;

DETAILED DESCRIPTION

A system to improve display efficiency based on recycling a local heat source is described. In one embodiment, the system includes a display and a lamp to illuminate the display. Heat from a heat generating component within the system is transferred to the lamp. In one embodiment, the lamp is a cold cathode fluorescent lamp (CCFL). The heat can be transferred to the lamp via conduction, convection, or radiated.

In the following description, numerous specific details are set forth. However, it is understood that embodiments may be practiced without these specific details. In other instances, well-known circuits, structures and techniques have not been shown in detail in order not to obscure the understanding of this description.

Reference throughout this specification to "one embodiment" or "an embodiment" indicate that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. In addition, as described herein, a trusted platform, components, units, or subunits thereof, are interchangeably referenced as a protected or secured.

Figure 1:
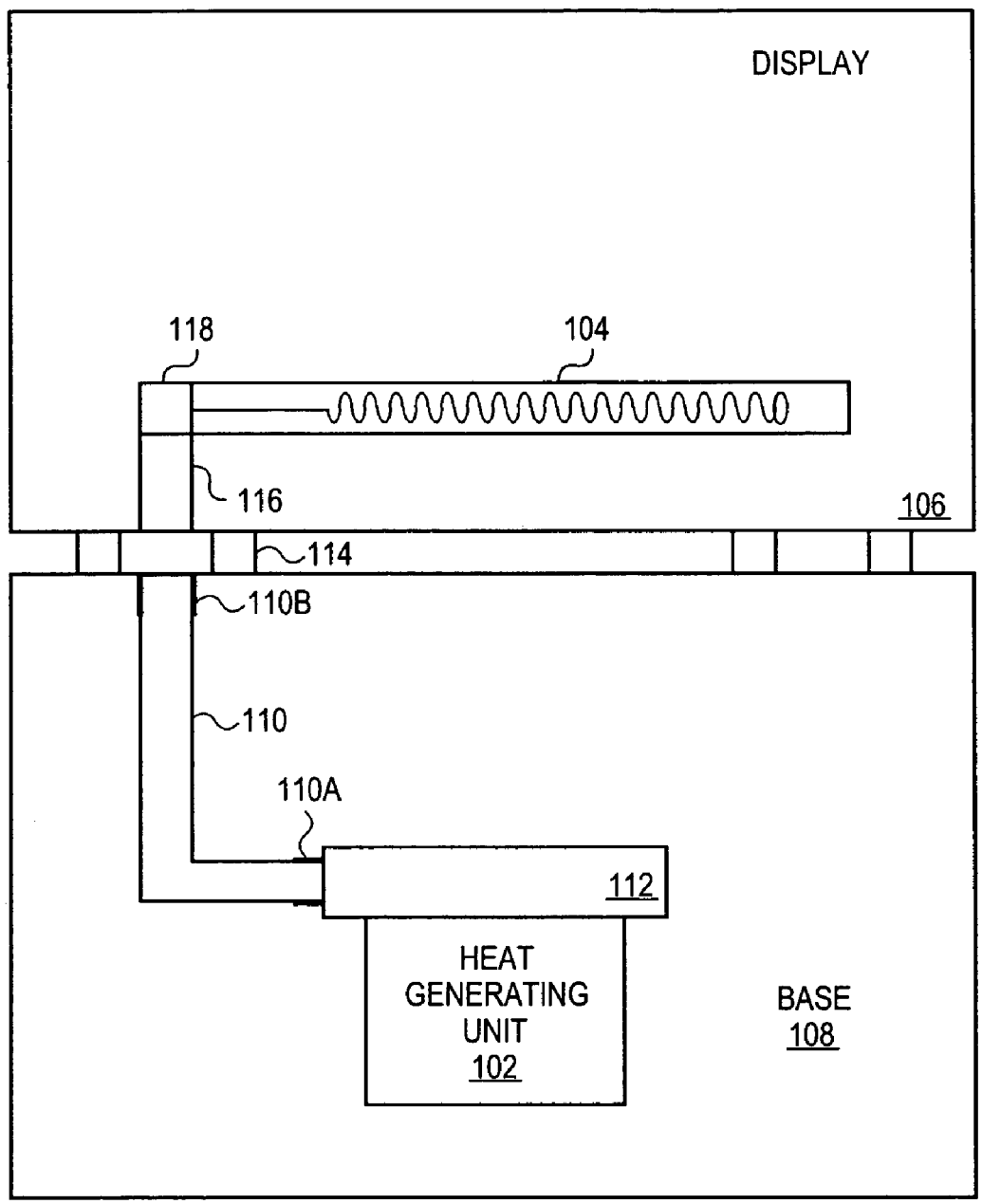

FIG. 1 illustrates one embodiment of a system 100 to transfer and apply heat from a heat generating component 102 within the system to a lamp 104 of a display 106. In one embodiment, the system 100 is a mobile computer, such as a notebook, laptop, tablet PC, or a Personal digital assistant (PDA). The techniques described herein may also be used in a desktop system. As show in FIG. 1, the display, as shown in the lid of the system, includes a lamp 104 as the backlight source. In one embodiment, the lamp is a CCFL. In alternative embodiments, other lamps may be used.

As described above, CCFL light output is a function of the input power applied to the lamp, as well as the lamp operating temperature. Higher light output levels often result in a form of self-heating that helps reduce the amount of electrical power necessary per unit of luminance. Conversely, applications which run at the lower range of available lamp luminance may require a larger amount of electrical input power to achieve a given level of luminance.

The system 100 of FIG. 1 also includes one or more heat generating components. The heat generating components may include, by way of example, a processor, a chipset, a graphics unit, a memory controller, a memory unit, and other circuitry that produces heat as a result of operation. In FIG. 1, the heat generating component 102 is shown in the base of the system 100. In alternative embodiments, the heat generating component(s) could be included in the lid of the system 100.

As further shown in FIG. 1, the system 100 includes a heat transfer unit 110 thermally coupled to the heat generating component 102. In one embodiment, the heat transfer unit 110 is coupled to a heat block 112 that is placed in surface contact with the heat generating component 102. The heat block 112 absorbs heat produced by the heat generating component 102. The heat in the heat block 112 is then transferred to the heat transfer unit 110.

In the embodiment shown in FIG. 1, the heat transfer unit 110 is a heat pipe device. The heat pipe transfers heat from one location 110a to a second location 110b. One embodiment of the heat pipe includes working fluid (water or other liquid) which vaporizes at the heat source end 110a, which in FIG. 1 is adjacent the heat generating component 102. The working fluid then travels through a hollow interior core, or wick, of the heat pipe, and condenses at a heat sink end 110b, which in FIG. 1 is at the hinge 114. The condensed liquid is then returned to the heat source end 110a by the capillary forces arising from the wick structure.

The heat pipe 110 of FIG. 1 transfers the heat from the heat generating component 102 to lamp 104 of the display 106. In one embodiment, the heat pipe 110 is thermally coupled to a bottom half of a hinge 114 interconnecting the lid and base of the system. The hinge conducts the heat to a second heat pipe 116 in the lid, thermally coupled to a top half of the hinge 114. In one embodiment, the second heat pipe 116 may be a flat heat pipe, given a preference to maintain a thin profile in the lid of a mobile system.

Figure 2:
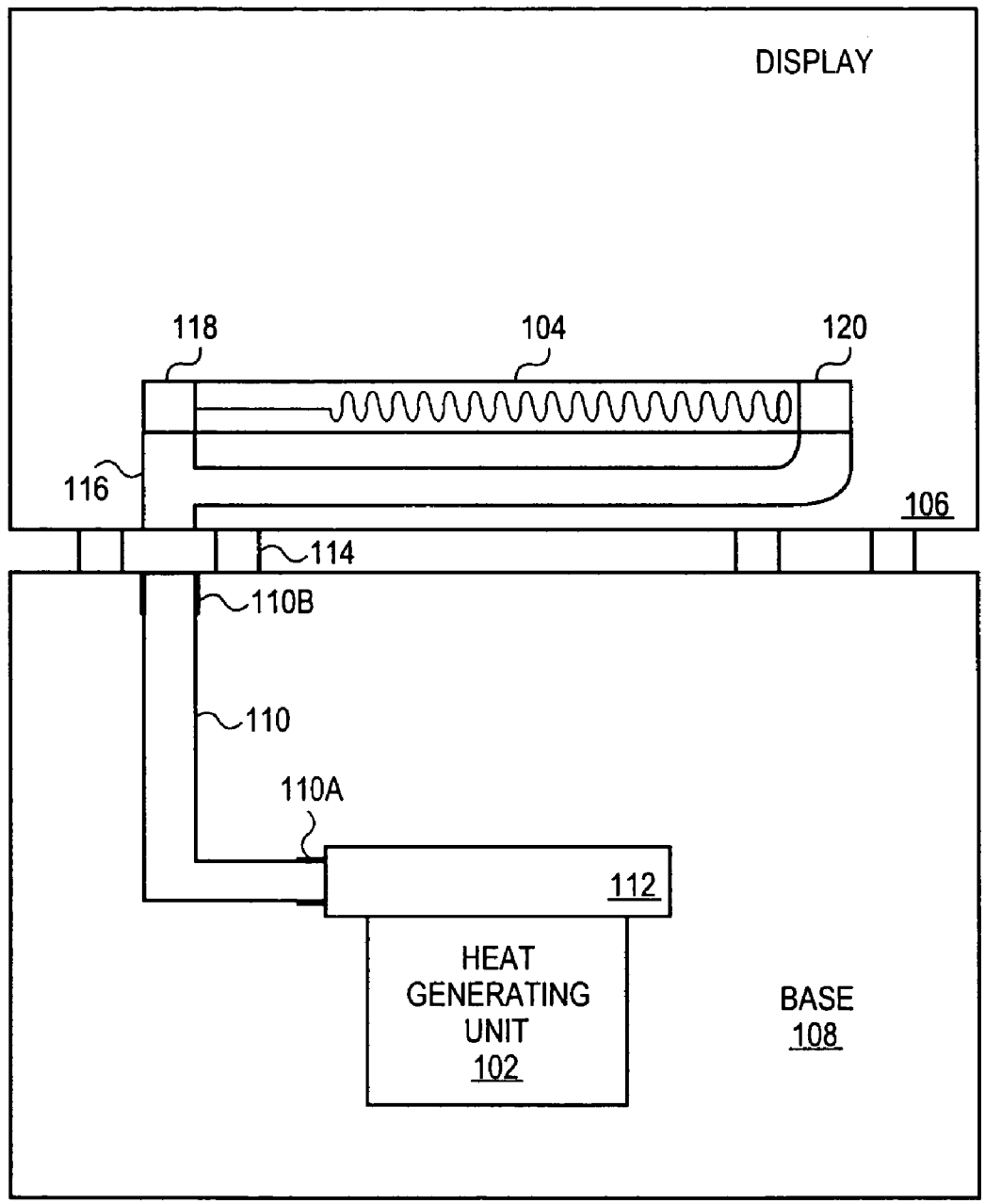
FIG. 2 illustrates a system to transfer and apply heat from a heat generating component within the system to a lamp of a display, according to an alternative embodiment.

The second heat pipe 116 transfers and applies the heat to the lamp 104 of the display. In one embodiment, as shown in FIG. 1, the second heat pipe is thermally coupled to a first end 118 of the lamp 104, to transfer and apply the heat to the lamp of the display. Alternatively, as shown in FIG. 2, the heat pipe 110, 116 may transfer and apply the heat to both ends 118 and 120 of the lamp 104.

As a result of transferring the heat from the heat generating component 102 to the lamp 104 of the display, a thermal boost to the lamp may be provided to raise the light production from the lamp at a given level of electrical input power. By controlling the amount of applied heat, the lamp electrical input power may reduced by an associated amount, thereby potentially conserving the system's 100 battery power consumption and expanding the battery operating time.

Figure 3:
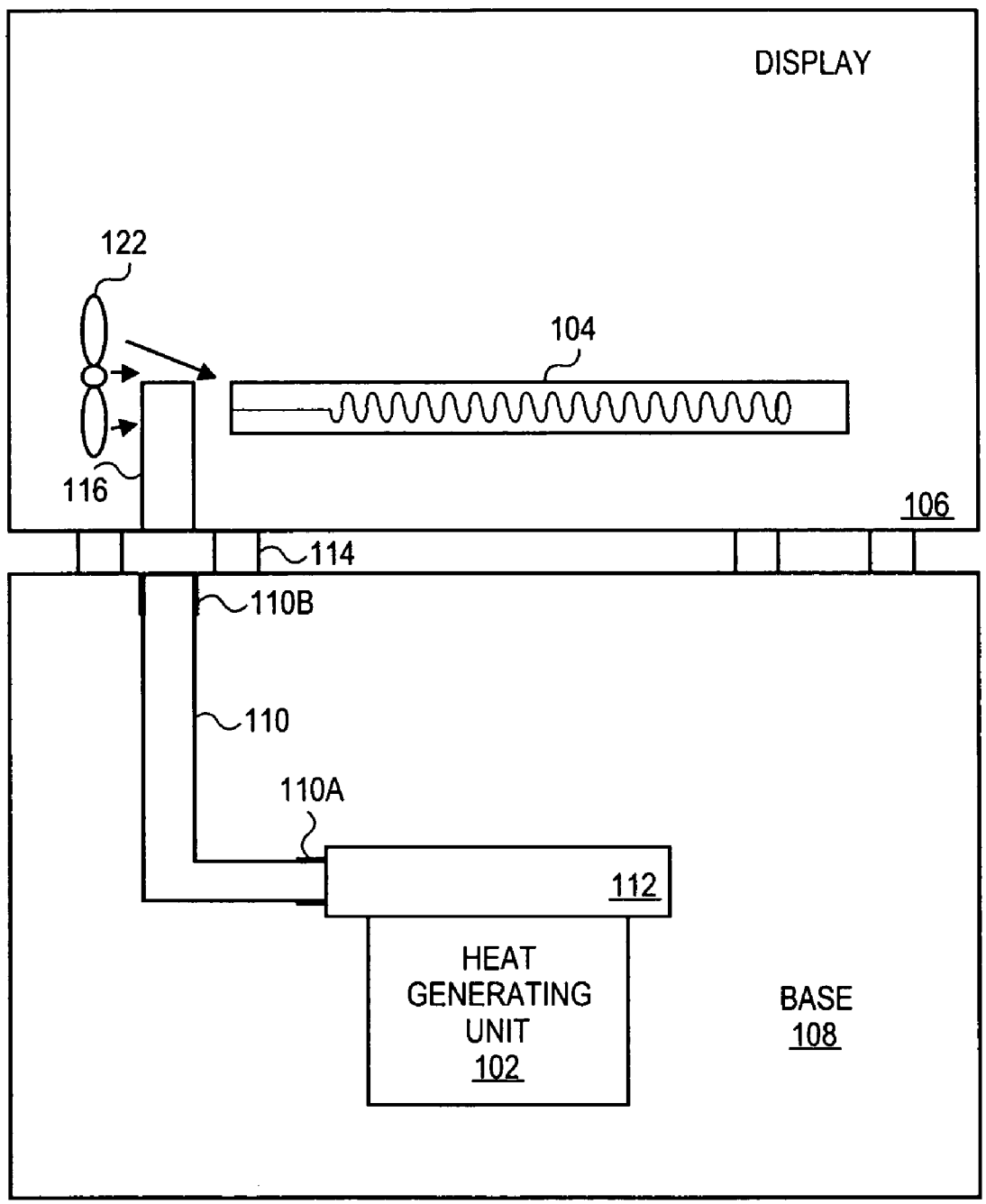
FIG. 3 illustrates a system to transfer and apply heat from a heat generating component within the system to a lamp of a display, according to another alternative embodiment.

In alternative embodiments, alternative techniques may be used to transfer heat to the lamp. For example as shown in FIG. 3, rather than having the heat pipe in thermal contact with the lamp, a heat exchanger 122 (such as a fan or synthetic jet) may generate air movement across an end of the heat pipe, and have the heated air flow against the lamp.

Figure 4:
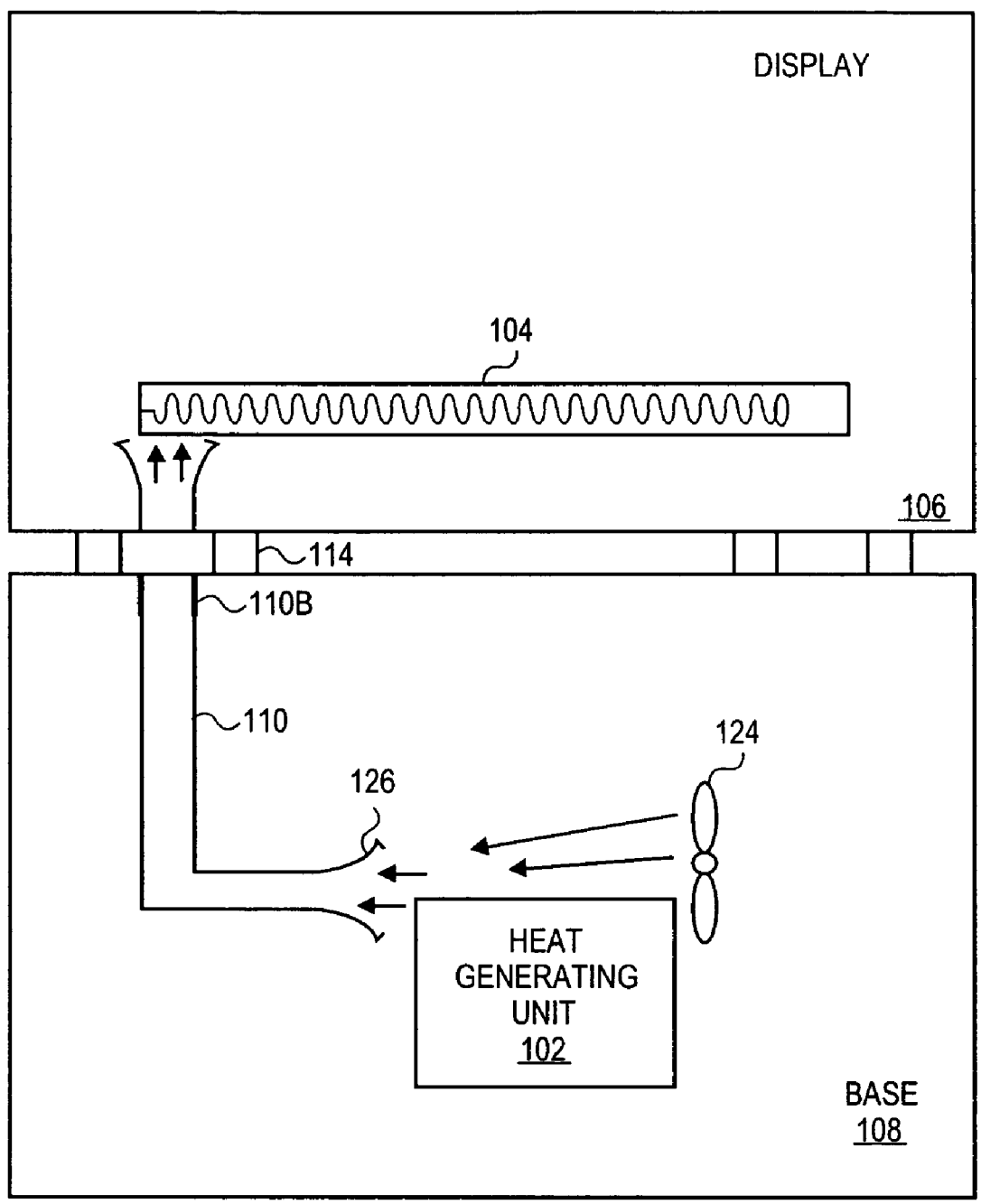
FIG. 4 illustrates a system to transfer and apply heat from a heat generating component within the system to a lamp of a display, according to yet another alternative embodiment.

In yet another alternative embodiment, as shown in FIG. 4, the heat may be transferred via the use of convection. A fan or synthetic jet unit 124 may generate air movement across the heat generating component 102. The air which has been heated as a result of moving across the heat component, may be funneled into a funnel 126 and transferred to the lid and released in the direction of the lamp 104. The heated air may be applied to one end of the lamp, both ends of the lamp, or released in the direction of other sections of the lamp.

In yet another alternative embodiment, a unit (not shown) is provided to control level of electrical input power provided to the lamp. In one embodiment, the unit includes a temperature sensor in the locality of the heat transfer unit's thermal transfer to the lamp to determine the level of heat being transferred to the lamp. Based on the a desired level of brightness to be generated by the lamp (which may be user or application determined), the unit may use the temperature reading to signal a power module to adjust the level of electrical input power to the lamp. Alternatively, the unit may control the level of heat applied to the lamp based on a measurement of the electrical input power provided to the lamp to maintain a desired level of brightness generated by the lamp.

In the foregoing specification, the invention has been described with reference to specific exemplary embodiments thereof. It will, however, be evident that various modifications and changes may be made thereto without departing from the broader spirit and scope of the invention as set forth in the appended claims. For example, the system described may also be used in a desktop system. The specification and drawings are, accordingly, to be regarded in an illustrative rather than a restrictive sense.

The invention claimed is:

1. A display comprising:
   a lamp to illuminate the display; and
   a heat pipe including a liquid capable of vaporizing coupled to the lamp to transfer heat from a heat generating component of a system to the lamp in the display, wherein the heat pipe is coupled to a first end of the lamp and a second end of the lamp, the heat pipe to apply heat to both the first and second ends of the lamp.

2. The display of claim 1, further including a unit to control a level of electrical power input provided to the lamp based on a level of the heat transferred to the lamp from the heat generating component.

3. The display of claim 2, wherein the unit comprises a temperature sensor in the locality of the lamp.

4. The display of claim 3, wherein the unit uses a temperature of the temperature sensor to signal a power module to adjust the level of electrical power input.

5. The display of claim 1, wherein the lamp comprises a cold cathode fluorescent lamp.

6. The display of claim 1, wherein the heat generating component is at least one of a group comprising of a processor, a chipset, a graphics unit, and a memory controller.

7. The display of claim 1, wherein the heat generating component is included in a lid of a mobile computer.

8. The display of claim 1, wherein the heat pipe comprises a flat heat pipe.

9. The display of claim 1, further comprising a unit to control a level of heat applied to the lamp to maintain a level of brightness generated by the lamp.

10. A system comprising:
    a display and a lamp to illuminate the display;
    at least one heat generating component;
    a transfer unit to transfer heat from the heat generating component to the lamp; and
    a unit to control a level of heat provided to the lamp based on a measurement of electrical input power provided to the lamp in order to maintain a particular level of brightness generated by the lamp.

11. The system of claim 10, wherein the unit comprises a temperature sensor in the locality of the lamp.

12. The system of claim 10, wherein the transfer unit comprises a heat pipe coupled to an end of the lamp.

13. The system of claim 12, wherein the heat pipe is coupled to a second end of the lamp.

14. The system of claim 10, further comprising a heat block thermally coupled between the heat generating component and the transfer unit.

15. The system of claim 10, wherein the lamp comprises a cold cathode fluorescent lamp, and wherein the heat generating component comprises a processor.

16. The system of claim 10, wherein the heat generating component is included in a lid of the system.

17. An apparatus comprising:
    at least one heat generating component;
    a transfer unit to transfer heat from the at least one heat generating component to a lamp of a display, wherein the transfer unit comprises a heat pipe including a liquid capable of vaporizing proximate the lamp, and wherein the transfer unit comprises a fan or synthetic jet unit that is located in the display to generate air movement across the heat pipe having the liquid that is capable of vaporizing and have the heated air flow against the lamp.

18. The apparatus of claim 17, further including a unit to control a level of electrical power input provided to the lamp based on a level of the heat transferred to the lamp from the heat generating component.

19. The apparatus of claim 18, wherein the unit comprises a temperature sensor in the locality of the lamp.

20. The apparatus of claim 19, wherein the unit uses a temperature of the temperature sensor to signal a power module to adjust the level of electrical power input.

21. The apparatus of claim 17, wherein the lamp comprises a cold cathode fluorescent lamp.

22. The apparatus of claim 17, wherein the heat generating component is at least one of a group comprising of a processor, a chipset, a graphics unit, and a memory controller.

23. The apparatus of claim 17, wherein the heat generating component is included in a lid of a mobile computer.

24. The apparatus of claim 17, wherein the heat pipe comprises a flat heat pipe.

* * * * *